United States Patent
Moriyama et al.

[15] 3,643,574
[45] Feb. 22, 1972

[54] FOCUSING DEVICE FOR OPTICAL EQUIPMENT

[72] Inventors: Hisao Moriyama, Chino; Katsuhide Takagi, Okaya, both of Japan

[73] Assignee: Sankyo Kogaku Kogyo Kabushiki Kaisha, Suwa-shi, Japan

[22] Filed: July 29, 1970

[21] Appl. No.: 58,828

[30] Foreign Application Priority Data

July 31, 1969 Japan..................................44/73096
Mar. 26, 1970 Japan..................................45/29202

[52] U.S. Cl.......................95/44 C, 178/DIG. 29, 178/7.92, 352/140
[51] Int. Cl.........................................................G03b 3/00
[58] Field of Search...........352/140, 139; 178/7.92, DIG. 29; 95/44 C; 350/76, 77

[56] References Cited

UNITED STATES PATENTS 2,186,615   1/1940   Mihalyi..................................99/44 C

FOREIGN PATENTS OR APPLICATIONS 758,179   12/1956   Great Britain..........................95/44 C
495,037   11/1938   Great Britain..........................352/140

Primary Examiner—Louis R. Prince
Assistant Examiner—Denis E. Corr
Attorney—McGlew and Toren

[57] ABSTRACT

A focusing device is provided for optical equipment of the type having a pair of windows providing respective focusing light beams, a taking lens system including a focusing lens having a bodytube, and a view finder optical system. The focusing device comprises a semitransparent focusing mirror positioned in the optical path of one focusing light beam and a focusing total reflector positioned in the optical path of the other light beam and reflecting the other light beam to the semitransparent mirror. Either the semitransparent mirror or the total reflector is connected to the bodytube of the focusing lens for angular displacement responsive to focusing movement of the focusing lens. An image-forming optical system of high magnification is positioned in the optical path behind the semitransparent mirror. An optical path switching reflector is disposed rearwardly of the image-forming lens system, and is moved into the optical path of the view finder optical system during focusing and moved out of the optical path of the view finder optical system after focusing has been effected. This movement of the switching reflector may be effected, through associated linkage, by depression of a manually operable switching button. Alternatively, the movement of the switching reflector can be effected, through suitable linkage, responsive to movement of a lens hood on the taking lens bodytube or cylinder.

9 Claims, 10 Drawing Figures

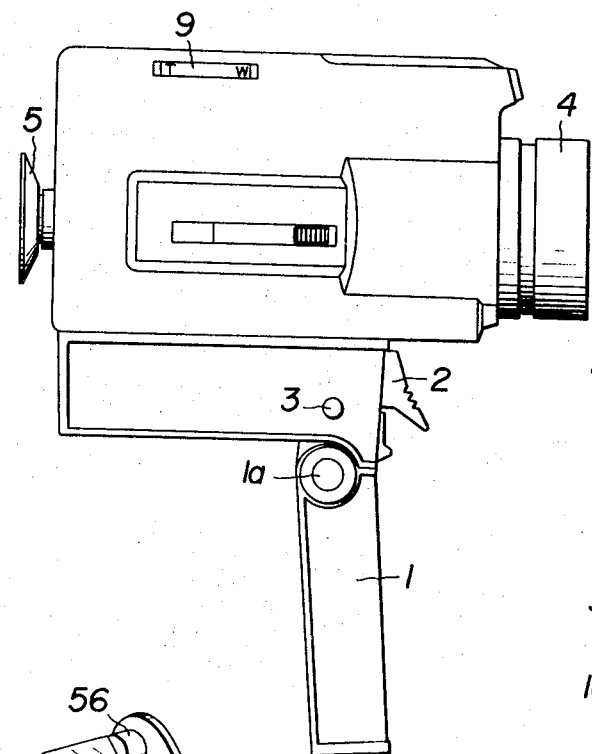
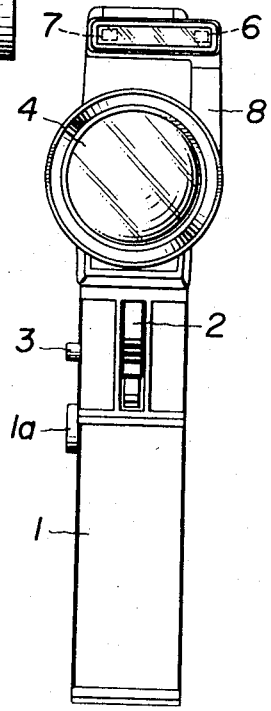
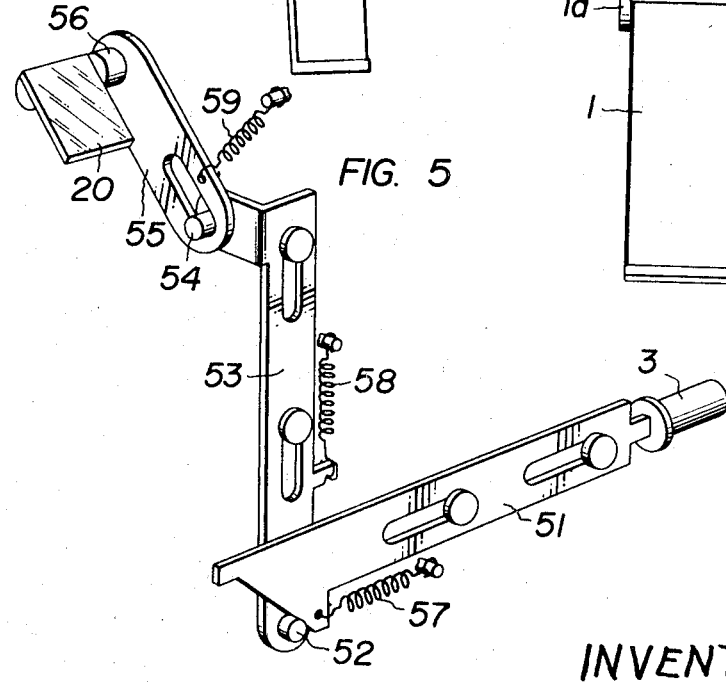

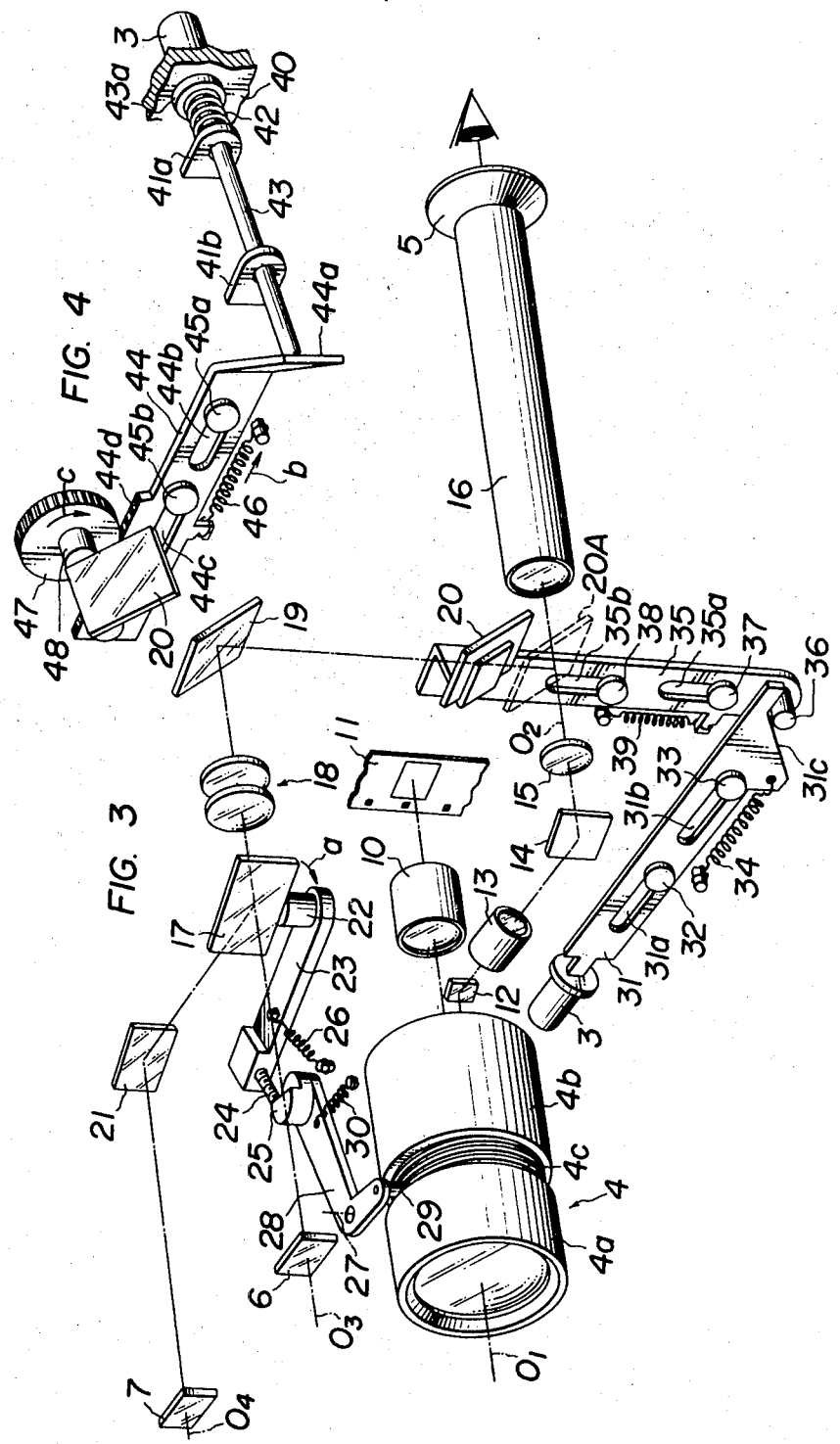

INVENTORS
HISAO MORIYAMA
KATSUHIDE TAKAGI

BY McGlew & Toren
ATTORNEYS

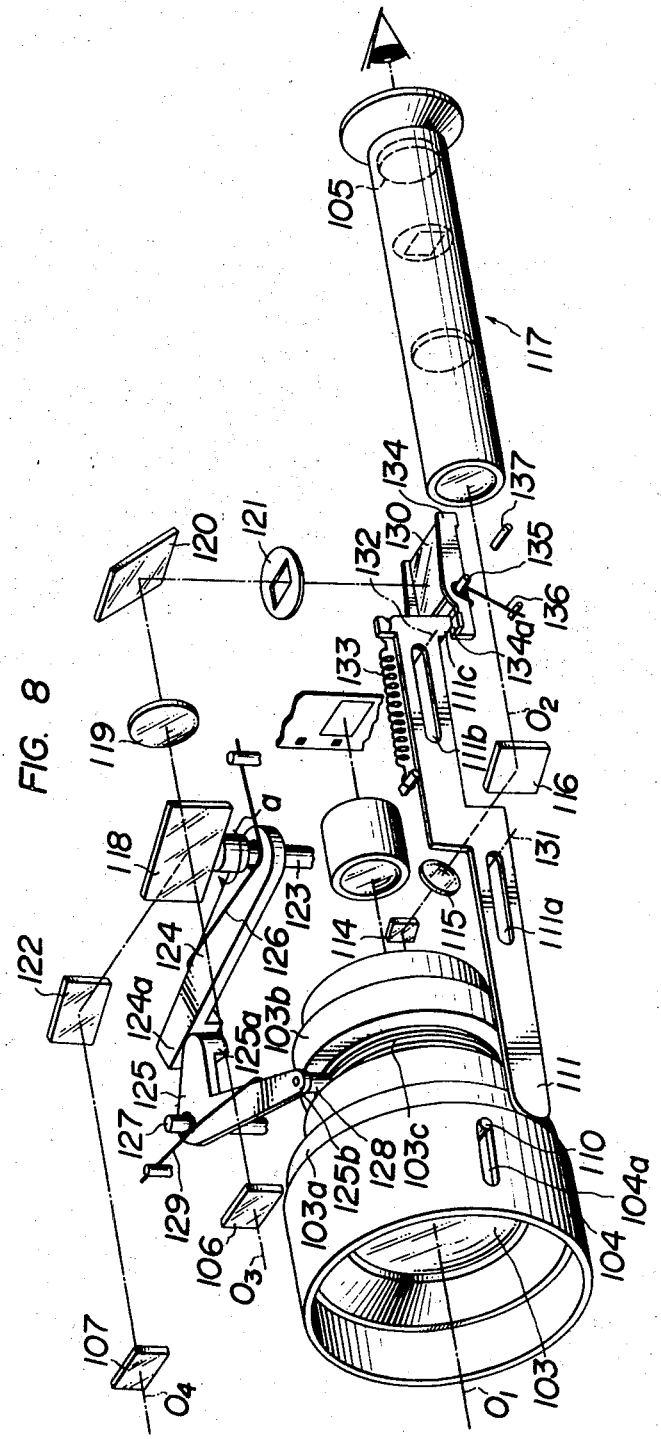

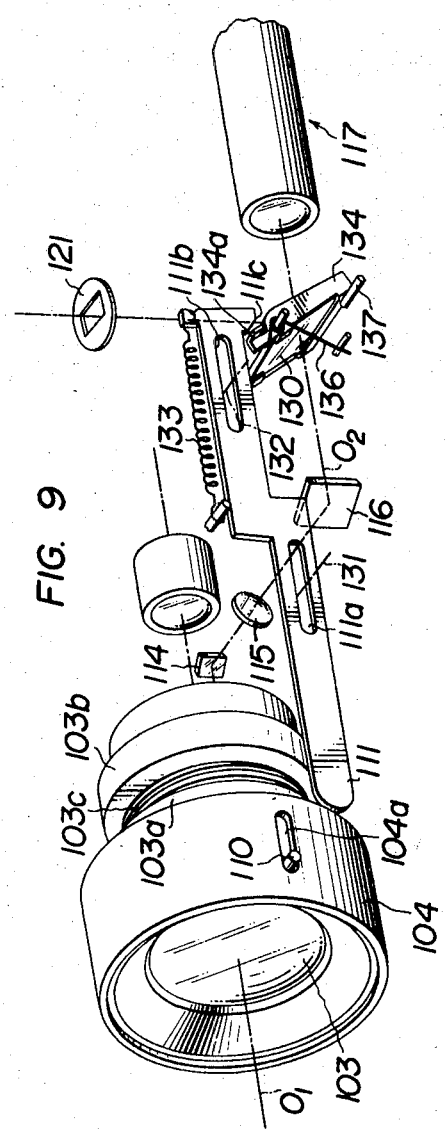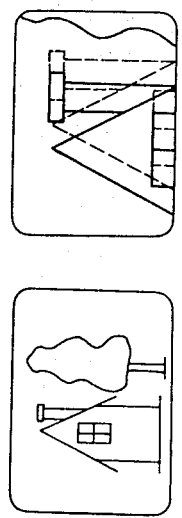

FOCUSING DEVICE FOR OPTICAL EQUIPMENT

BACKGROUND OF THE INVENTION

This invention relates to focusing devices for optical equipment and, more particularly, to a focusing device for optical equipment such as movie cameras and television cameras which have a picture-taking system or a range finder system.

A range finder of "the double-image coincidence system" has been used in 35 mm. photographic cameras and it is well known that this is an excellent range-finding arrangement. However, in movie cameras and television cameras it has, heretofore, been difficult to use this range finder, without modification from the way it is used in 35 mm. photographic cameras, because of structural limitations of movie cameras and television cameras. To date, such a double-image coincidence range finder has not been used in either movie cameras or television cameras. In particular, where movie cameras or television cameras are provided with a zoom lens, it has been particularly difficult to incorporate the double-image coincidence range finder, due to the fact that the field of view in the view finder may vary successively as zooming is effected, the magnification of the image is not constant, and an optical system of the single-lens reflex type is used for the view finder.

In movie and television cameras, it has hitherto been customary to use, as a range finder, either a transverse image split system, utilizing a split image focusing plate of a fine sawtooth shape, or a focusing system utilizing a microprism focusing plate of a fine pyramid shape. These range finders are not without disadvantages. In particular, the focusing field of view is disposed in the central portion of the field of view of the view finder at all times, causing considerable annoyance to the user or operator. When such cameras are provided with a zoom lens, range finding can be accomplished only in the "telephoto position," in which the view finder attains the highest magnification. No focusing can be effected in the "wide angle position" of low magnification. Moreover, the range finders of this type require fine adjustments when the cameras are assembled and adjusted, resulting in a low production rate of the cameras.

SUMMARY OF THE INVENTION

The objective of the present invention is to obviate the disadvantages of prior art focusing devices. To this end, the present invention is directed to the provision of a focusing device, for movie or television cameras, which permits a marked increase in the accuracy of focusing and further provides for switching instantly between the "view finder field of view" and the "focusing field of view" by a simple operation. Thus, the operator of the camera can view either of the two fields of view, as desired, through the same eyepiece, and irrespective of whether or not the camera has a zoom lens.

More particularly, in accordance with the present invention, an optical path switching reflector is mounted for movement into the optical path of light beams entering a view finder, and also moveable out of this path. The switching reflector is moved into the optical path of the view finder when the camera is being focused, and is moved out of the optical path of the view finder after focusing has been effected. Such selective movement of the optical path switching reflector may be effected manually, by operation of a pushbutton, or automatically, responsive to axial movement of a lens hood of the taking lens system.

An object of the invention is to provide an improved focusing device for optical equipment.

Another object of the invention is to provide such a focusing device which is particularly adaptable to movie and television cameras.

A further object of the invention is to provide such a focusing device including a selectively positionable optical path switching reflector.

Another object of the invention is to provide such a focusing device in which the switching reflector is moved into the optical path of a view finder, during focusing of the camera, and moved out of the optical path of the view finder, after focusing has been completed.

For an understanding of the principles of the invention, reference is made to the following description of typical embodiments thereof as illustrated in the accompanying drawings.

BRIEF DESCRIPTION OF THE DRAWINGS

In the drawings:

FIG. 1 is a front elevation view of a movie camera incorporating the present invention;

FIG. 2 is a left side elevation view of the camera shown in FIG. 1;

FIG. 3 is an exploded perspective view of one embodiment of focusing device in accordance with the invention;

FIG. 4 is a perspective view of another form of operating means for an optical path switching reflector incorporated in a focusing device embodying the invention;

FIG. 5 is a perspective view of another form of switching reflector operating means;

FIG. 8 is an exploded perspective view of the embodiment of the focusing device provided in the camera shown in FIGS. 6 and 7;

FIG. 9 is a view similar to FIG. 8 but illustrating another position of the parts; and FIGS. 10a and 10b are schematic views showing the fields of view of the finder under two different conditions.

DESCRIPTION OF THE PREFERRED EMBODIMENTS

Figure 7:
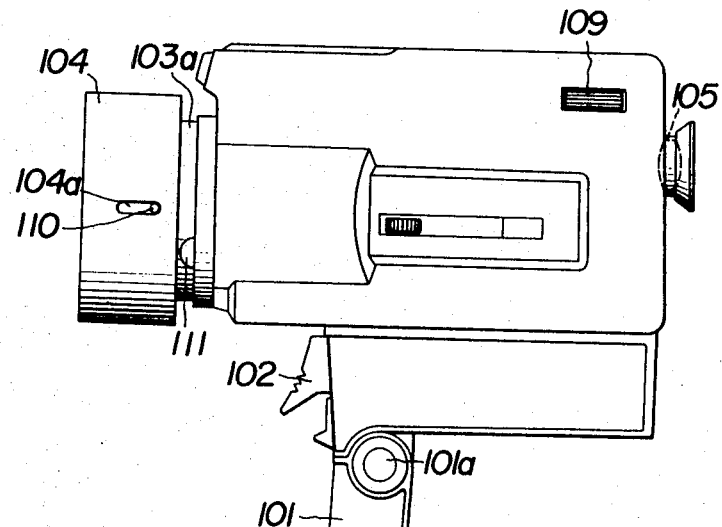
FIG. 7 is a right side elevation view of the camera shown in FIG. 6.

Referring first to FIGS. 1 and 2, the small movie camera illustrated therein comprises a handle 1, a shutter-operating button 2, and a pushbutton 3, for switching between optical paths, forming part of a range and view finder which will be described in more detail hereinafter. The camera shown in FIGS. 1 and 2 further includes a zoom lens 4 for picture taking, an eyepiece frame 5 of a view finder of the single-lens reflex type, and windows 6 and 7 for introducing focusing light beams as described hereinafter. A casing 8 is provided for an optical system for directing a focusing light beam into a view finder optical system, and the camera further includes a power zooming operating button 9.

Handle 1 is pivotally mounted on a shaft 1a, so that it can be moved clockwise about this shaft, as viewed in FIG. 2, to be positioned within the camera body when the camera is not in use. Shutter-operating button 2 and pushbutton 3 are so positioned that, when handle 1 is in its extended position, as shown in FIGS. 1 and 2, the operator can grip handle 1 in his right hand and push shutter button 2 by the index finger of the right hand in taking a picture and, if necessary, can depress pushbutton 3 by the same index finger. It should be understood, however, that shutter-operating button 2 and pushbutton 3 may be mounted in any other desired positions, depending on the design of the camera.

In the usual operation of the small movie camera shown in FIGS. 1 and 2, the operator first grips handle 1 in his right hand and directs the camera toward a subject. Then the operator lays his left hand on top of the camera and views the subject through the eyepiece (not shown) while operating the power zooming operating button 9 by the index and middle fingers of the left hand, if necessary. Thereafter, the operator effects focusing by depressing the pushbutton 3 by the index finger of the right hand, if necessary. As soon as the range finding has been completed, the operator releases the index finger of his right hand from pushbutton 3 and then pushes the shutter-operating button 2 to begin the picture taking. Picture taking is continued while a series of such operations are performed in combination.

FIG. 3 shows the relation between the focusing device embodying the invention and the optical system of the view finder. Referring to FIG. 3, when the camera is in a normal state in which pushbutton 3 is not depressed, the light beam from the subject, represented by the optical axis 01 of the taking lens, is incident upon a taking lens system 4. In the embodiment illustrated in FIG. 3, the optical system is a zoom lens or afocal system, as mentioned above, which has only the function of varying the magnification optically and which does not have any function in forming an image. Taking lens system 4 comprises a range adjusting front lens 4a and an optical system proper 4b. An image-forming optical system 10, generally referred to as a master lens or release lens, cooperates with taking lens system 4 to form an inverted image of the subject in a film 11 disposed rearwardly of lens system 10.

Disposed between taking lens system 4 and optical system 10, and in a position deflected laterally from optical axis 01, there is a small mirror 12 which is adapted to direct the light beam to a view finder optical system of the single-lens reflex type. The part of the light beam deflected from optical path 01 by mirror 12 passes through a finder objective lens 13, and its optical path is then deflected by a second mirror 14 so as to form an aerial inverted image on view finder optical axis 02 in a position in advance of a field of view lens 15. This inverted image is converted into an erect image, and magnified to a suitable level, by a finder image converting optical system 16 so as to be viewed through the eyepiece. The field of view seen through the eyepiece, at this time, is an erect image trimmed by the picture angle determined by the focal length of the zoom lens and the magnification thereof, and is as shown in FIG. 10a. This erect image corresponds to the same field of view as that formed on film 11. This field of view will, therefore, be referred to as a view finder field of view.

The two windows 6 and 7, positioned above taking lens system 4, form entries for focusing light beams represented by optical axes 03 and 04, respectively. When the subject (not shown), spaced some distance from the film plane of the camera, is focused, the light beam entering through window 6 passes through a semitransparent mirror 17 and forms an aerial inverted image of the subject on the extension of optical axis 03, due to the action of image-forming lenses 18. This image is formed at a position substantially midway between a reflector 19, disposed behind image-forming lenses 18, and an optical path switching reflector 20, disposed beneath reflector 19. Image-forming lenses 18 are optically selected with respect to the finder image converting optical system 16 in such a manner that the aerial inverted image, formed by the image-forming lenses 18 in the extension of optical axis 03, and the view finder aerial inverted image, formed in the optical axis 02 before the field of view lens 15, are formed on conjugate points.

Lenses of a relatively great focal length are used as the image-forming lenses 18. Accordingly, the mentioned aerial inverted image has a high magnification and is larger than the inverted image of the view finder, thereby increasing the precision and accuracy of focusing. Another reason for using lenses of a large focal length is that the focusing field of the image, as shown in FIG. 10b, may be viewed fully in the field of view of the view finder. This arrangement provides for preventing the effective picture from being disturbed when it is not possible to provide a sufficiently large reflector 21 behind window 7, due to the internals of the camera. Reflector 19 is a total reflector for turning the optical path of the focusing system for introducing a focusing light beam into the view finder optical system. It is selected taking into consideration the external dimensions of the camera.

On the other hand, the light beam entering through window 7 has its optical path 04 deflected by total reflector 21 to impinge on semitransparent mirror 17, to be combined with the light beam from window 6 and directed toward the image-forming lenses 18.

Semitransparent mirror 17 is firmly secured to one end of a vertical shaft 22 rotatably supported on a fixed portion of the camera, and a lever 23 is firmly secured at one end to the opposite end of shaft 22. Thus, semitransparent mirror 17 and lever 23 pivot as a unit. A threaded pin 24 extends horizontally forward from the free end of lever 23, and engages a cam 25. A spring 26 biases lever 23 to swing clockwise about the axis of shaft 22, as viewed in FIG. 3. Thus, pin 24 firmly engages cam 25 at all times.

Cam 25 is firmly secured to the end of one arm of a lever 28 pivotally supported by a vertical shaft 27, and a downwardly directed vertical pin 29 is firmly secured to the end of the other arm of lever 28. A spring 30 biases lever 28 to pivot clockwise about vertical shaft 27, as viewed in FIG. 3. Thus, pin 29 is maintained in contact with the outer peripheral surface of the rear end portion of a bodytube of the range-adjusting front lens 4a or range-adjusting lens tube. A helicoidally threaded portion 4c is formed in the outer peripheral surface of the rear end portion of this bodytube, with the bodytube of front lens 4a being threaded received in a tube of the optical system 4b in such a manner that, as the bodytube of front lens 4a is rotated, lens 4a is displaced axially along optical axis 02 with respect to optical system 4b.

As the bodytube of range-adjusting front lens 4a of taking lens system 4 is axially reciprocated, its movement is transmitted, through pin 29, lever 28, cam 25, pin 24 and to lever 23, so that semitransparent mirror 17 is angularly displaced a minute amount to effect range finding using the double-image coincidence principle. Thus, taking lens system 4 can be focused in respect to the distance between the subject field and the camera. Front lens 4a is disposed deep within optical system 4b, with respect to the subject field of infinity, and its position is gradually shifted forwardly as the lens is focused with relation to a distance less than infinity.

Threaded pin 24 forms a fine adjustment element for setting the double-image coincidence at an object at infinity. Once pin 24 is set, it is possible to effect, through cam 25, accurate range finding and focusing of distances ranging from infinity to the shortest focusable distance.

The incident light beams for focusing, entering through windows 6 and 7, are parallel to each other with respect to a subject field at infinity, and are parallel to the incident light beam for picture taking entering into taking lens system 4. At this time, semitransparent mirror 17 and reflector 21 are disposed at an angle of 45° with respect to the optical axes 03 and 04, respectively. Reflector 21 is firmly fixed in this position, but mirror 17 is so designed that, as the distance between the subject field and the camera becomes smaller and front lens 4a is moved forwardly, mirror 17 is displaced angularly a minute amount in the direction of arrow a about the axis of shaft 22, to increase the angular displacement of mirror 17 to a value greater than 45°, until the images coincide. It is to be understood, however, that while semitransparent mirror 17 is illustrated as movable and reflector 21 as fixed, in the embodiment of the invention shown in FIG. 3, mirror 17 may be fixed and reflector 21 may be made rotatable, depending on the design of the camera.

The distance between optical axes 03 and 04 is the so-called base line. The range-finding capability of this type of range finder is determined by the effective base line value obtained by multiplying the base line value by the magnification of the focusing optical system. In the present invention, the focusing optical system has a high magnification, by virtue of the combination of the image-forming lenses 18 with the finder image converting optical system 16, as mentioned above. Thus, the value of effective base line, in the invention arrangement, is greater than the base line value or the distance between optical axes 03 and 04, thereby greatly increasing the accuracy of focusing.

The construction and operation of the combination of the view finder optical system with the focusing optical system, of the double-image coincidence arrangement in accordance with the invention, have been described. With pushbutton 3 not being depressed, optical path switching reflector 20 is in a position outside the view finder optical path 02, as shown in solid lines in FIG. 3. When reflector 20 is in this position, the view finder field of view (see FIG. 10a) can be viewed through the eyepiece, and it is possible to determine the picture angle of the subject by operating the zoom ring (not shown) of taking lens system 4 to effect zooming. At this time, no focusing field of view enters the view finder field of view, so that the operator can view only the view finder field of view without being disturbed by other fields of view.

In the arrangement shown in FIG. 3, pushbutton 3 is positioned against one end of a sliding member 31 slidably supported by pins 32 and 33 loosely received in respective slots 31a and 31b. Member 31 normally is biased by spring 34 to press against pushbutton 3 with one end, and has a bevelled edge 31c at the other end against which is positioned a pin 36 firmly secured to one end of a reflector supporter 35. Supporter 35 is slidably supported by pins 37 and 38 loosely received in respective slots 35a and 35b, and is biased upwardly, as viewed in FIG. 3, by a spring 39. Switching reflector 20 is mounted at the upper end of supporter 34, and tilted at an angle of 45° with respect to the optical path of the focusing light beam. As mentioned, reflector 20 is disposed outside optical path 02 of the view finder while pushbutton 3 is not depressed.

When a focusing operation is performed, pushbutton 3 is depressed to move sliding member 31 against the bias of spring 34. As a result, pin 36 is moved downwardly by bevelled edge 31c of member 31, moving reflector holder 35 downwardly. This causes the reflector 20 to move into a position 20A shown in broken lines in FIG. 3, this position being in the focusing optical path where reflector 20 is disposed at an angle of 45° with respect to the focusing optical path and the view finder optical path. While reflector 20 is in this dotted line position, the view finder field of view, which has been viewed by the operator through the eyepiece, is blocked by reflector 20, and the focusing field of view (see FIG. 10b) can be viewed through the eyepiece. The focusing field of view is intended only for setting the proper focus and with high magnification, as mentioned. This makes it possible to readily effect accurate range finding and focusing using the double-image coincidence principle.

When focusing has been effected, range-adjusting front lens 4a is set accurately in a position compatible with the distance between the subject and the camera, permitting the immediate start of picture taking. If the operator moves his finger from the pushbutton 3 at this time, sliding member 31 and reflector holder 35 are automatically restored to the original position by the bias of springs 34 and 39, respectively. This moves reflector 20 out of the view finder optical path 02, and brings the view finder field of view to the eyepiece immediately, eliminating the necessity of taking the eye away from the eyepiece. Thus, it is possible to start picture taking at once without requiring that zooming and trimming be effected again.

Another embodiment of the operating means for switching reflector 20 is shown in FIG. 4, in which pushbutton 3 is fitted loosely in an opening formed in a sidewall 40 of the camera body. If pushbutton 3 is depressed, a sliding bar 43, loosely supported by supporting members 41a and 41b and biased against pushbutton 3 by a coil spring 62 mounted between the flange 43a and supporting member 41a, is moved against the bias of spring 42 to press, at its forward end, against a bevelled portion 44a of a sliding plate carrying a rack 44d. Plate 44, which is slidably supported by pins 45a and 45b loosely received in respective slots 44b and 44c, and biased to move in the direction of arrow b by a spring 46, has its range of movement restricted by slots 44b and 44c and pins 45a and 45b.

As bevelled surface 44a of plate 44 is pushed by bar or slide 43, plate 44 moves in a direction opposite to the direction of the arrow b against the bias of spring 46. As a result, a rack 44d on plate 44, which meshes with a gear 47, rotates gear 47 in the direction of arrow c. Gear 47 is supported at one end of a shaft 48 which supports reflector 20 at the other end. Thus, as gear 47 rotates, reflector 20 rotates in the same direction as gear 47, with reflector 20 moving into a position in which it is tilted at an angle of 45° with respect to the focusing optical path and the view finder optical path at the end of rotation of gear 47. As reflector 20 assumes this position, the focusing field of view can be viewed through the eyepiece.

Upon release of pushbutton 3, slide or bar 43 is restored to the original position by the bias of spring 42 and, at the same time, plate 44 is restored to its original position by the bias of spring 46, causing gear 47 to rotate in a direction opposite to the direction of the arrow c. Consequently, reflector 20 is moved out of the view finder optical path and the view finder field of view can be viewed through the eyepiece. A slight restoring force is imparted to gear 47 so that this gear may operate positively.

FIG. 5 illustrates still another embodiment of the operating means for switching reflector 20. In this embodiment, when pushbutton 3 is depressed, a slide $5_1$, having a bevelled left end, as viewed in FIG. 5, is moved longitudinally and effects, through a pin 52, engaging the bevelled left end, downward movement of an intermediate 53. In FIG. 5, member 53 is illustrated in its lower position. Downward movement of member 53 causes an arm 55, having a slot in which there is engaged a pin 54 on the upper end of member 53, to pivot clockwise about the axis of a shaft 56 having arm 55 secured to one end thereof. Reflector 20 is fixed to the other end of shaft 56, and thus pivots in the same direction as arm 55 and into a position in which it is tilted at an angle of 45° with respect to the focusing optical path and the view finder optical path. Thus, the focusing field of view can be viewed while reflector 20 is in this tilted position. If pushbutton 3 is released after completion of the focusing, slide 51, intermediate member 53 and arm 55 are automatically restored to their respective original positions under the bias of respective springs 57, 58, and 59, so that reflector 20 is moved out of the view finder light path.

While various mechanical operating means for light path switching reflector 20 have been described above, it will be understood that other mechanical means also may be used. For example, a suitable sensing member may be provided on the lens ring or on the outer bodytube portion of front lens 4a of the taking lens system, and reflector 20 may be switched between its two positions either mechanically or electrically responsive to gripping of the lens ring to effect focusing.

Alternatively, the shutter-button may be designed to operate in several strokes. Thus, the finder field of view may be viewed when the shutter-button is not depressed, the focusing field of view may be viewed when the shutter-button is pressed to move in a first stroke, and the finder field of view can be viewed when the shutter-button is pressed to move in a second stroke, so that picture taking may be started with a certain time lag.

Figure 6:
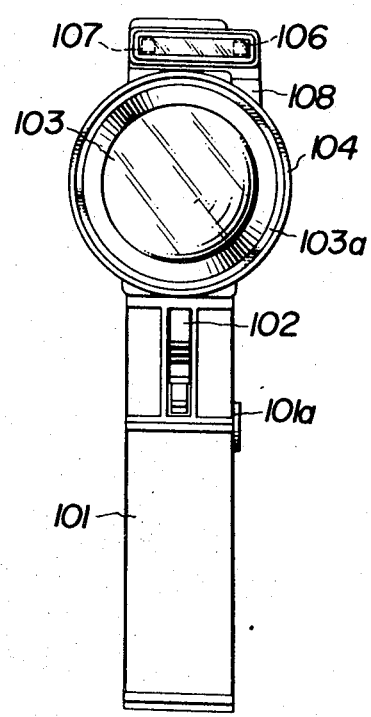
FIG. 6 is a front elevation view of a movie camera incorporating another embodiment of a focusing device in accordance with the invention.

FIGS. 6 to 9 show a further embodiment of the operating means for the optical path switching reflector 20, and which operating means utilizes a lens hood provided on the taking lens bodytube to reciprocate axially. Referring to FIGS. 6 and 7, the small movie camera shown therein comprises a handle 101, a shutter-operating button 102, a taking zoom lens 103 and a lens hood 104 loosely fitted over a lens bodytube 103a. The camera also includes an eyepiece 105 of a view finder of the single-lens reflex type, windows 106 and 107 for entry of focusing light beams, a casing 108 for an optical system introducing a focusing light beam into a view finder optical system, and a visibility adjusting ring 109 (see FIG. 7).

Lens hood 104 is fitted loosely over bodytube 103a of taking zoom lens 103, and is formed with an axially extending slot 104a, as best seen in FIG. 7, loosely receiving a pin 110 connected to bodytube 103a. Lens hood 104 rotates with bodytube 103a as a unit, but is slidable axially of bodytube 103a. A connecting bar 111, as seen in FIG. 7, normally urges lens hood 104 to move outwardly and presses, with its forward end, against the edge of the rear end of lens hood 104. Thus, lens hood 104 normally is disposed in this forward position to serve as a lens hood.

Connecting bar 111 is adapted, as described hereinafter, to switch the field of view, viewed through the eyepiece, from "view finder field of view" to the "focusing field of view" when lens hood 104 is moved rearwardly against the biasing force exerted by connecting bar 111.

Referring to FIGS. 8 and 9, the light beam entering through window 107 has its optical path 04 turned by a total reflector 122, and the deflected light beam is combined with the light beam 03 entering through window 106, at a semitransparent mirror 118. The combined light beam passes through the mirror 118 and toward an image-forming lens 119.

Semitransparent mirror 118 is firmly secured to one end of a vertical shaft 123 rotatably supported by a fixed part of the camera, which has not been shown, and an arm 124 is fixed at one end to the other end of shaft 123 so that mirror 118 and arm 124 pivot as a unit. A lever 125 has a shorter arm with a rounded end 125a engaging one side edge of the free end portion 124a of arm 124. A spring 126 biases arm 124 to pivot counterclockwise about the axis of shaft 123, as viewed in FIG. 8. Thus, the forward end 124a of arm 124 is always under pressure contact with the rounded end 125a of lever 125.

Lever 125 is supported for pivotal movement by a vertical shaft 127, and includes a longer arm having a forward end 125b to which there is secured a depending pin 128. A spring 129 biases lever 125 to pivot clockwise about the axis of shaft 127, as viewed in FIG. 8, so that pin 128 is maintained in engagement with a rear end surface of bodytube 103a of the range-adjusting front lens of taking lens 103. The outer peripheral surface of the rear end of bodytube 103a is formed with a helicoidal 103c by means of which bodytube 103a is displaced axially along optical axis 01 with respect to bodytube 103b of the taking lens system. As lens cylinder or bodytube 103a of the range-adjusting front lens of taking lens 103 is displaced axially, its movement is transmitted through pin 128 and lever 125 to arm 124. Consequently, semitransparent mirror 118 is angularly displaced very finely.

If lens hood 104 has been moved to its rearward position and a light path switching reflector 130 disposed below a mask 121 has moved to its lower position, as seen in FIG. 9, to switch the field of view viewed to the eyepiece from the "view finder field of view" to the "focusing field of view" at this time, then range finding can be effected by bringing the two images into coincidence so as to focus taking lens 103 with respect to the distance between the subject and the camera. If lens hood 104 has not been moved to its rearward position, switching reflector 130 is disposed in a position in which it is out of the view finder optical path, as shown in FIG. 8. With reflector 130 in this latter position, the view finder field of view, as seen in FIG. 10a, can be viewed through the eyepiece and it is possible to determine the picture angle of the subject by operating the zoom ring (not shown) of taking lens 103 to effect zooming.

In FIG. 8, connecting bar 111 extends along or parallel to optical axis 01 as far as switching reflector 130, and is formed with axially extending slots 111a and 111b through which there loosely extend respective fixed pins 131 and 132 for supporting connecting bar 111. A spring 133 is connected between a fixed portion of the camera body and the rear end of bar or slide 111, to bias bar 111 to press against the edge of the rear end of lens hood 104 at all times.

On the other hand, switching reflector 130 is supported on a support member 134 whose base is pivotally supported by a horizontal shaft 135, support 134 being biased by a spring 136 to pivot clockwise about the axis of shaft 135, as viewed in FIG. 8. A sidewall of support 134, aligned with connecting bar 111, is upwardly bent at its forward end to provide a pressing tab 134a. While lens hood 104 is not moved to its rearward position, a downwardly directed protuberance 111c at the rear end of bar 111 presses against pressed portion 134a to hold this portion in a lower position. With pressed portion 134a in its lower position, reflector 130 is maintained substantially in a horizontal position, thereby blocking the focusing light beam and permitting the view finder light beam to be introduced to the eyepiece. It will be noted that connecting bar 111 is partly bent or offset so as not to interrupt the view finder light path.

The operating means for the optical path switching mirror 30, as shown in FIGS. 6 through 9, operates in the following manner. If lens hood 104 is moved to its rear position, as shown in FIG. 9, connecting bar 111 moves rearwardly and protuberance 111c, at the rear end of bar 111, is released from engagement with pressed portion 134a of support 134 for reflector 130. This permits the support 134, and thus reflector 130, to pivot clockwise about the axis of shaft 135 from the position shown in FIG. 8 into the position shown in FIG. 9, in which support 134 and reflector 130 are tilted, with the free end of support 134 engaging a stop 137.

With switching reflector 130 positioned as shown in FIG. 9, the view finder optical path is blocked by reflector 130 and the focusing optical path is directed into the eyepiece. Accordingly, it is possible to effect focusing by looking through the eyepiece of the view finder, since lens cylinder 103a of the front lens of taking lens 103 rotates if lens hood 104 is moved rearwardly and rotated while in its rearward position. Reflector 130 operates quickly and smoothly by virtue of spring 136, so that the performance of this embodiment of the operating means for the switching reflector is highly satisfactory. The field of view viewed through the eyepiece at this time is one which is, as shown in FIG. 10b, exclusively for focusing and independent of other fields of view. However, the focusing field of view, at this time, has a high magnification, as mentioned, so that it is possible to readily effect accurate range finding and focusing.

If focusing is effected, then lens tube or cylinder 103a is set accurately in a position compatible with the distance between the subject and the camera, making it possible to begin picture taking immediately. If the operator or user's hand is removed from the lens hood 104 at this time, then connecting bar 111 is restored automatically and quickly to its original position by the biasing force of spring 133. Consequently, reflector 130 is moved out of the view finder light path and the view finder field of view is instantly directed into the eyepiece.

From the foregoing description, it will be appreciated that the focusing device of the invention permits the field of view, viewed through the eyepiece, to be switched instantly from a view finder field of view of the single-lens reflex type, which is normally viewed, to a focusing field of view, of high magnification, merely by moving lens hood 104 rearwardly for operating the optical path switching reflector 130 when focusing is to be effected. By this arrangement, it is possible readily to view the view finder field of view and the focusing field of view independently of each other, and to effect accurate range finding in the focusing field of view.

An additional advantage resides in the fact that the focusing can be effected irrespective of the focal length of the zoom lens, by using the focusing device in accordance with the invention. This eliminates the need to effect focusing at a telephoto position, which has been required in conventional cameras. The switching between the two fields of view is very simple in operation and can be effected without removing the eye from the eyepiece. With the focusing arrangement of the invention, missing of a chance to "shoot" a subject is easily prevented.

While specific embodiments of the invention have been shown and described in detail to illustrate the application of the principles of the invention, it will be understood that the invention may be embodied otherwise without departing from such principles.

What is claimed is:

1. A focusing device, for optical equipment of the type including a taking lens system, means providing two focusing light beams, and a view finder optical system, said focusing device comprising, in combination, a semitransparent focusing mirror positioned in the optical path of one focusing light beam; a totally reflecting focusing mirror positioned in the optical path of the other focusing light beam and operable to direct the other focusing light beam to said semitransparent mirror; means coupling one of said mirrors to the cylinder of the focusing lens of said taking lens system for angular displacement of said one mirror responsive to focusing adjustment of said focusing lens; a high-magnification image-forming focusing lens system positioned in the optical path of the focusing light beam rearwardly of said semitransparent mirror; an optical path switching reflector positioned rearwardly of said image-forming lens system; and means operable to move said switching reflector between a first position, in which it is positioned in the optical path of said view finder optical system during focusing of the optical equipment, and a second position in which said switching reflector is positioned outside the optical path of said view finder optical system, after focusing has been effected.

2. A focusing device for optical equipment, as claimed in claim 1, in which said switching reflector, in both positions thereof, is disposed in the optical path of the focusing light beam.

3. A focusing device for optical equipment, as claimed in claim 1, including means biasing said switching reflector to said second position.

4. A focusing device for optical equipment, as claimed in claim 3, including manual means selectively operable to move said switching reflector to said first position during focusing of said taking lens system.

5. A focusing device for optical equipment, as claimed in claim 4, in which said manual means comprises a slide and a pushbutton to operate said slide.

6. A focusing device for optical equipment, as claimed in claim 4, in which said manual means effects linear displacement of said switching reflector from said second position to said first position.

7. A focusing device for optical equipment, as claimed in claim 4, in which said manual means effects angular displacement of said switching reflector from said second position to said first position.

8. A focusing device for optical equipment, as claimed in claim 4, in which said manual means comprises a lens hood mounted on said focusing lens cylinder for axial displacement therealong; and a slide extending between said lens hood and said switching reflector.

9. A focusing device for optical equipment, as claimed in claim 4, in which said optical equipment is a camera having a shutter-operating button; said shutter-operating button constituting said manual means and having a first operated position effecting movement of said switching reflector from said second position to said first position, and having a second operated position for picture taking.

* * * * *